United States Patent [19]
Dirr

[11] Patent Number: 5,989,469
[45] Date of Patent: Nov. 23, 1999

[54] METHOD FOR MAKING A NON-DRIP VALVE FOR AN INVERTED CONTAINER

[75] Inventor: Mark S. Dirr, Park Ridge, Ill.

[73] Assignee: Knight Plastics, Inc., Evansville, Ind.

[21] Appl. No.: 08/927,845

[22] Filed: Sep. 11, 1997

[51] Int. Cl.⁶ ............................ B29C 53/02; B29C 65/70
[52] U.S. Cl. ......................... 264/255; 264/250; 264/295; 264/296
[58] Field of Search ................................ 264/295, 296, 264/339, 370, 242, 250, 255

[56] References Cited

U.S. PATENT DOCUMENTS

| | | |
|---|---|---|
| 571,708 | 11/1896 | Thompson . |
| 1,881,929 | 10/1932 | Pottenger, Jr. . |
| 1,897,276 | 2/1933 | Petersen . |
| 1,977,227 | 10/1934 | Berendt . |
| 2,540,842 | 2/1951 | Stanley et al. . |
| 2,788,160 | 4/1957 | Hertz . |
| 2,876,935 | 3/1959 | Lindberg . |
| 2,912,999 | 11/1959 | Kersh . |
| 2,913,749 | 11/1959 | Ayres . |
| 3,067,787 | 12/1962 | Salk . |
| 3,116,747 | 1/1964 | Cowles et al. . |
| 3,165,242 | 1/1965 | Jackson . |
| 3,490,658 | 1/1970 | Schwartzman . |
| 3,545,682 | 12/1970 | Beard . |
| 3,726,436 | 4/1973 | Despain et al. . |
| 3,768,705 | 10/1973 | Spatz . |
| 3,770,167 | 11/1973 | Ewald . |
| 3,779,276 | 12/1973 | King . |
| 3,794,213 | 2/1974 | Schwartzmann . |
| 3,913,809 | 10/1975 | Nilson . |
| 3,937,371 | 2/1976 | Del Bon . |
| 4,038,358 | 7/1977 | Wrasman . |
| 4,132,334 | 1/1979 | Danks . |
| 4,209,485 | 6/1980 | Greenspan . |
| 4,375,825 | 3/1983 | Greenspan . |
| 4,580,701 | 4/1986 | Tamaki . |
| 4,646,945 | 3/1987 | Steiner . |
| 4,660,747 | 4/1987 | Borg et al. . |
| 4,728,006 | 3/1988 | Drobish et al. . |
| 4,747,522 | 5/1988 | McIntyre . |
| 4,782,985 | 11/1988 | Kinsley . |
| 4,869,405 | 9/1989 | Rudick . |
| 4,903,867 | 2/1990 | Mettenbrink . |
| 4,924,899 | 5/1990 | Po . |
| 4,938,390 | 7/1990 | Markva . |
| 4,942,911 | 7/1990 | Herbet . |
| 4,991,745 | 2/1991 | Brown . |
| 5,005,737 | 4/1991 | Rohr . |
| 5,007,545 | 4/1991 | Imbery, Jr. . |
| 5,033,655 | 7/1991 | Brown . |
| 5,038,957 | 8/1991 | Gross . |

(List continued on next page.)

*Primary Examiner*—Jan H. Silbaugh
*Assistant Examiner*—Michael Poe
*Attorney, Agent, or Firm*—Leydig, Voit and Mayer

[57] ABSTRACT

A valve and method are provided wherein the valve has a membrane which is molded and cured in a naturally cupped or concave shape, but wherein the membrane is elastically inverted or deflected inside-out so that the direction of concavity is reversed. The membrane is positioned concentrically within a cylindrical or tubular dispensing spout so that the inverted membrane is cupped toward an exit direction of the spout. By inverting the membrane, a reliable radially-outward sealing bias is formed between a peripheral edge of the membrane against an interior of the tubular spout. When mounted on the bottom of a squeeze container, the valve is effective to dispense fluid from the container when squeezed, permit air to breathe back into the container after squeezing, and to sealably prevent leakage from the container.

14 Claims, 16 Drawing Sheets

U.S. PATENT DOCUMENTS

| | | |
|---|---|---|
| 5,071,017 | 12/1991 | Stull . |
| 5,114,047 | 5/1992 | Baron et al. . |
| 5,115,950 | 5/1992 | Rohr . |
| 5,125,539 | 6/1992 | Schneider . |
| 5,169,030 | 12/1992 | Lewin . |
| 5,184,760 | 2/1993 | Weinstein et al. . |
| 5,213,236 | 5/1993 | Brown et al. . |
| 5,240,149 | 8/1993 | Schmidt . |
| 5,271,531 | 12/1993 | Rohr et al. . |
| 5,275,309 | 1/1994 | Baron et al. . |
| 5,309,961 | 5/1994 | Franke . |
| 5,310,112 | 5/1994 | Meshberg . |
| 5,339,995 | 8/1994 | Brown et al. . |
| 5,353,968 | 10/1994 | Good, Jr. . |
| 5,363,890 | 11/1994 | Yeung et al. . |
| 5,377,877 | 1/1995 | Brown et al. . |
| 5,398,853 | 3/1995 | Latham . |
| 5,409,144 | 4/1995 | Brown . |
| 5,409,659 | 4/1995 | Matsumoto et al. . |
| 5,431,290 | 7/1995 | Vinciguerra . |
| 5,439,143 | 8/1995 | Brown et al. . |
| 5,472,021 | 12/1995 | Tsao et al. . |
| 5,492,253 | 2/1996 | Proshan . |

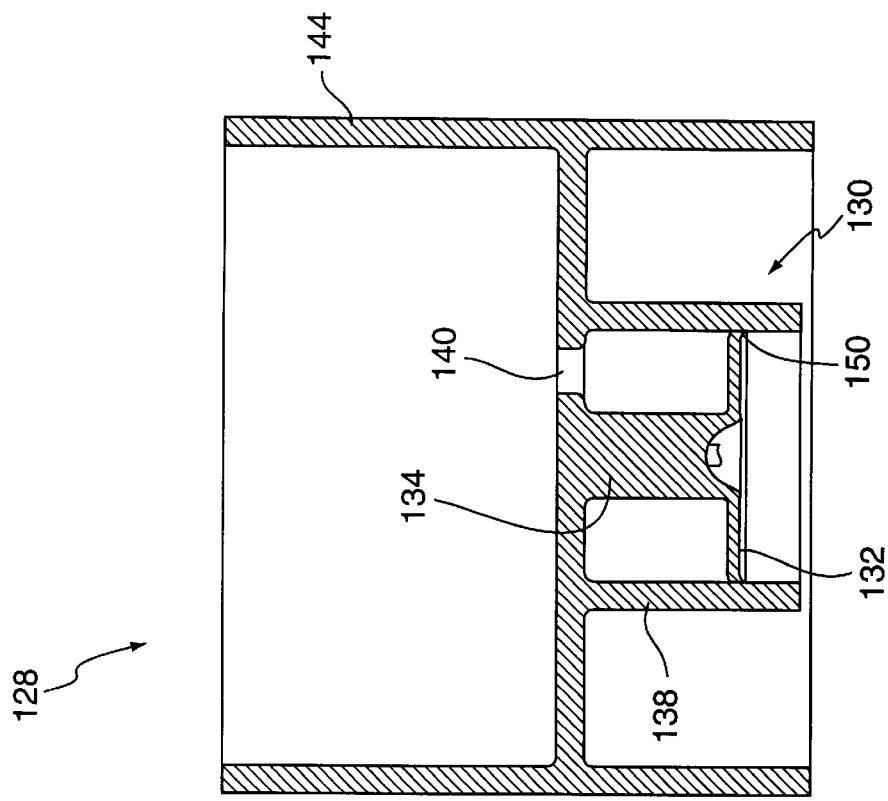
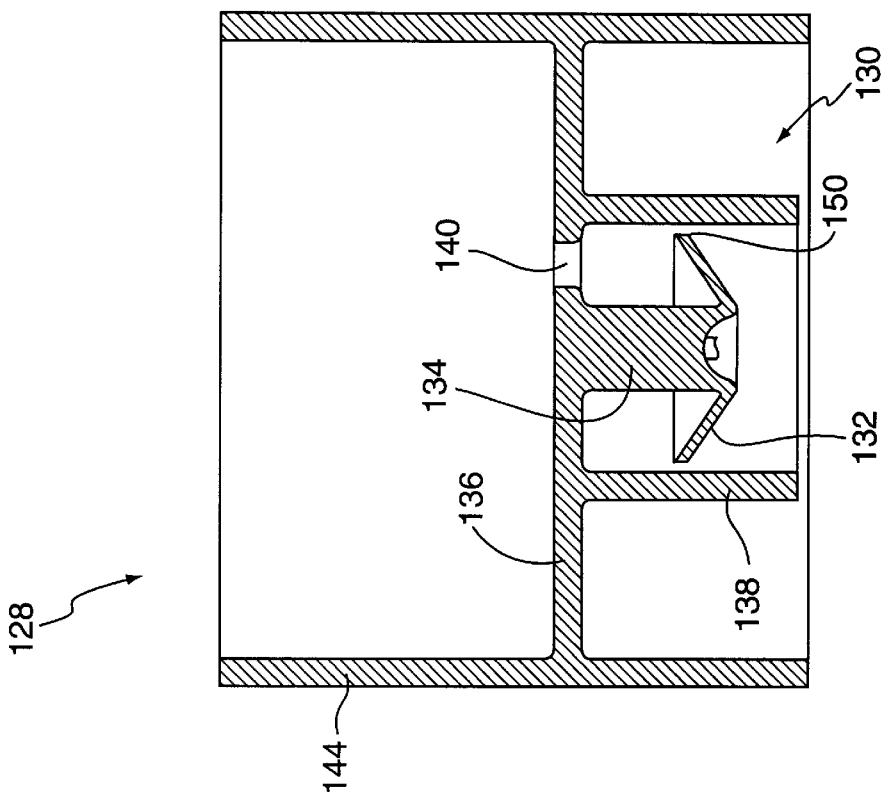

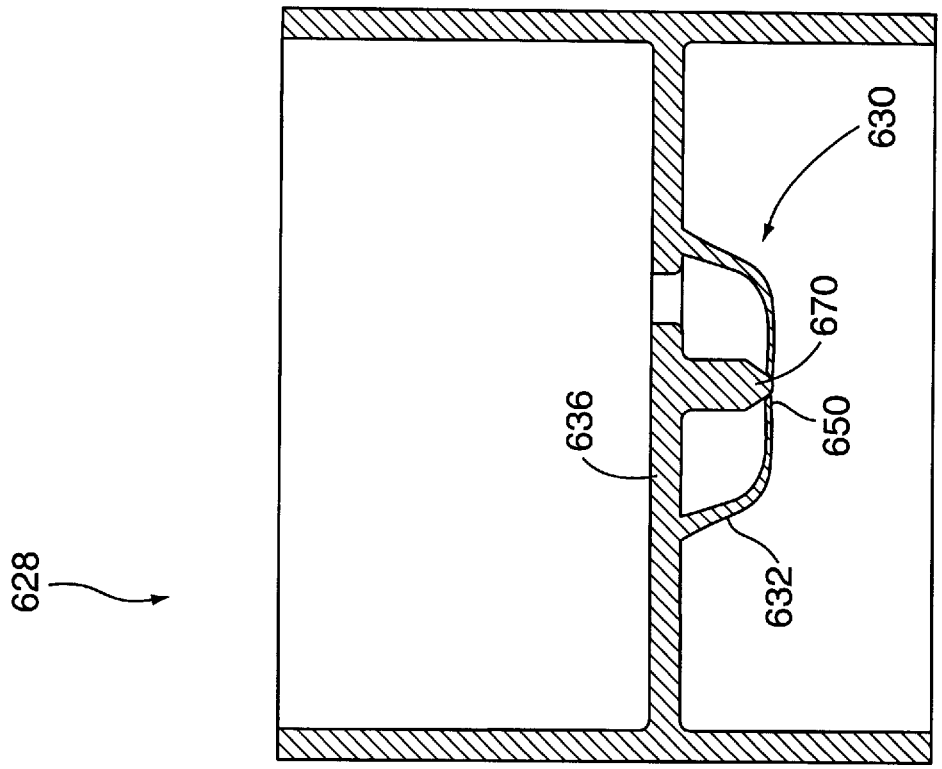
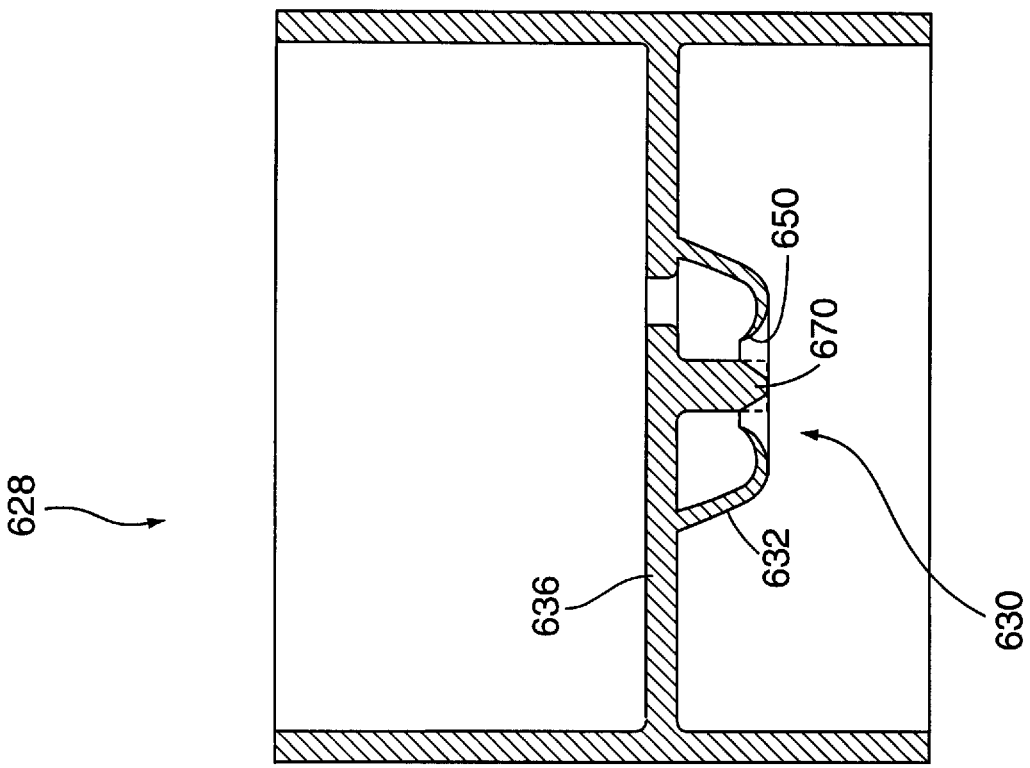

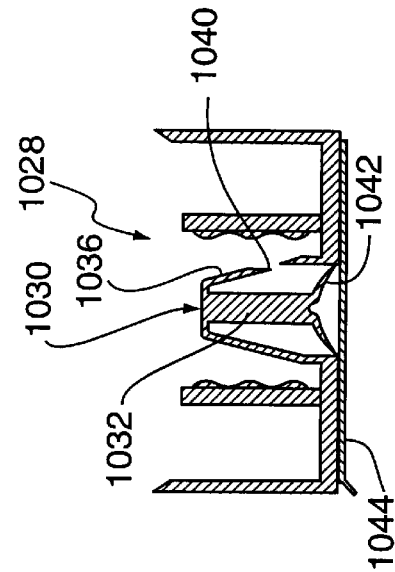
FIG. 17
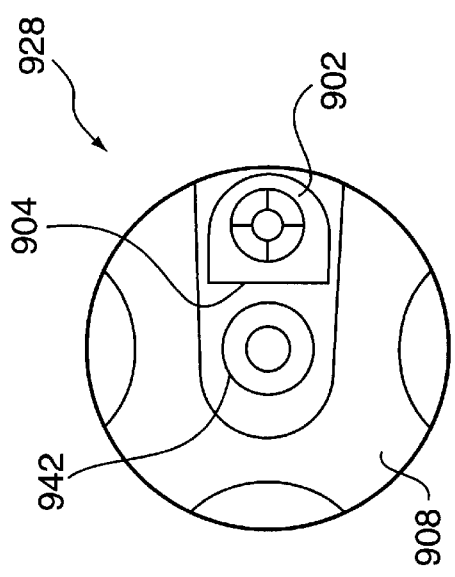
FIG. 18A
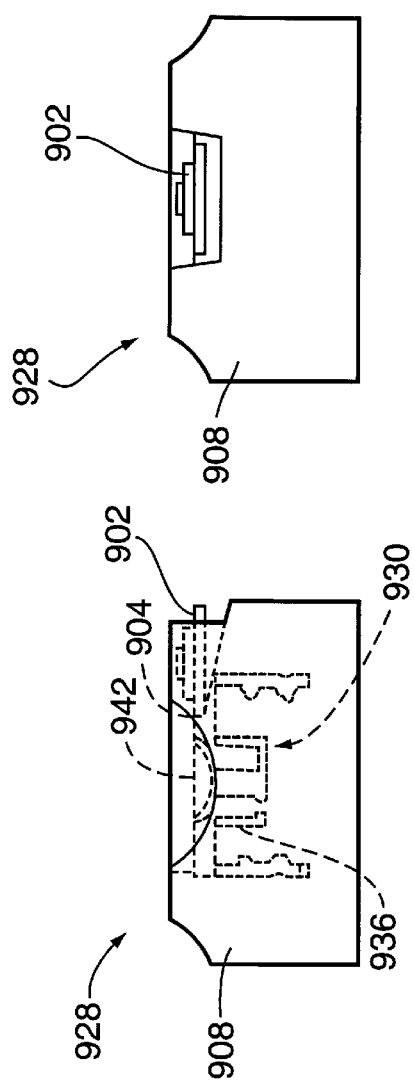
FIG. 18C
FIG. 18B

METHOD FOR MAKING A NON-DRIP VALVE FOR AN INVERTED CONTAINER

FIELD OF THE INVENTION

The present invention relates to a pressure-actuatable valve and a method for its manufacture. More particularly, the present invention relates to a dispensing valve suitable for use in a bottom-dispensing squeeze container and a method for integrally molding such a valve.

BACKGROUND OF THE INVENTION

Various closures are available for squeeze-bottle dispensing containers. Squeeze bottles are often used for packaging soap, shampoo, hair conditioner, and other shower and bath related products. In order to improve dispensability, convenience and marketing appeal, "inverted" squeeze containers have been introduced with bottom-mounted dispensing valves. Such a container configuration has been most commonly utilized in shower and bath products.

A valve for use in inverted containers is desirably pressure-actuatable to dispense a fluid product upon squeezing of the container. After dispensing, the valve permits a "suckback," breathing in air so that the container returns to its unsqueezed interior volume. After breathing, the valve desirably self-seals to prevent leakage from the container until squeezed again. Conventional self-sealing dispensing valves designed for this application have displayed poor or inconsistent performance. One problem, for example, is that some such valves may leak the product.

A common dispensing valve style includes a flexible slitted diaphragm provided at an opening of the container. When the bottle is squeezed, the diaphragm flexes outwardly, thereby dilating the slit to permit the fluid to discharge. Such slitted-diaphragm valves are disclosed in U.S. Pat. Nos. 4,646,945, 4,728,006, 4,991,745, 5,033,655, and 5,071,017. Other types of self-sealing dispensing valves are also known, such as those disclosed in U.S. Pat. Nos. 3,768,705, 5,125,539.

Therefore, a need exists for an improved self-sealing pressure-actuated dispensing valve which overcomes the deficiencies of known valves and which exhibits good performance. More specifically, it is an object of the invention to provide a valve for an inverted container which dispenses fluid, and then seals to effectively prevent any further passage of fluid due to gravity.

Additionally, it is desirable to manufacture such a valve in a manner that is economical and which ensures reliable performance. Thus, a simple valve design is needed, as well as an improved method for manufacturing such a valve. A method of molding a conventional integral valve is disclosed in U.S. Pat. No. 4,375,825.

SUMMARY OF THE INVENTION

The present invention provides an improved valve suitable for a non-drip closure on a bottom-dispensing or "inverted" container. To this end, a valve according to an embodiment of the invention includes a membrane which has a naturally cupped or concave shape, but wherein the membrane is elastically inverted or deflected inside-out so that the direction of concavity is reversed. The membrane is fixed concentrically within a tubular dispensing spout so that a periphery of the inverted membrane annularly contacts a wall of the spout. Thus, a resilient sealing bias is formed between the inverted membrane and the spout.

The valve advantageously improves squeeze container performance. When mounted on the bottom of a squeeze container, the valve dispenses fluid upon pressurization of the container by squeezing, the inverted membrane flexing to permit passage of the fluid through the spout. When the container is relaxed, the membrane permits a "suckback" of air into the container and then resumes its sealable contact with the spout.

The present invention also provides an improved method for making such a valve. The method includes integrally molding an elastomeric material to form the membrane in a first, natural shape. After the material has been at least partially cured, the membrane is elastically inverted away from its naturally-molded shape or flipped inside-out to a second shape so that an edge of the membrane resiles against the spout and is biased in a sealed contact.

Preferably, the valve is integrally formed with a stem extending centrally from the membrane, the stem and spout extending concentrically from a planar deck wall. In a preferred embodiment, the deck wall extends outwardly beyond the spout, and is integrally formed with a cylindrical mounting wall that concentrically surrounds the spout. This mounting wall is useful for securing the valve in a container opening.

A process of making the valve preferably involves a mold assembly which forms a cavity in the desired natural valve shape. The cavity is preferably shaped to form a valve which includes the aforementioned membrane, stem, spout, deck wall and surrounding mounting wall. The valve mold assembly generally includes at least three interfitting mold members. An upper cap mold member is shaped to form the upper face of the deck wall opposite the stem, the mounting wall, and an outer surface of the wall, while the lower cap mold member and the valve inversion mold member fit concentrically in an axially-sliding manner to form the lower face of the wall deck, the valve membrane and the stem, the spout and the interior of a portion of the mounting wall.

Material is injected into the cavity, and the mold members are held in their relative positions for a sufficient period to permit at least partial curing of the elastomeric material. The mold members are disassembled in a manner which automatically inverts the membrane. Specifically, the valve inversion mold member is axially withdrawn from the lower cap mold member, and then the lower cap mold member is withdrawn, collapsibly pulling the membrane through a stem-forming portion of the cavity defined by the lower cap mold member.

Preferably, a peripheral edge of the membrane temporarily grips a corresponding tip of the valve inversion mold member, thereby automatically pulling the membrane to the inverted state when the valve inversion mold member is axially withdrawn from the lower cap mold member. This inversion due to the temporary gripping to the valve inversion mold member has been found to advantageously reduce the chances that the membrane might be inadvertently torn during withdrawal of the lower cap mold member.

In a further embodiment, a valve according to an alternate embodiment of the invention is made by a method of molding a first component without the stem, but instead having a narrow post. A second valve component including the stem and membrane are then molded onto the post area of the first valve component. This method permits the membrane and stem to be advantageously made of a softer, more flexible material than the other valve elements, such as the spout, deck wall and mounting wall.

It will thus be appreciated that the present invention provides an improved valve for bottom-mounted dispensing from an inverted container. The valve reliably dispenses fluid from the inverted container and then reseals to prevent or deter leakage of fluid. Thus, the valve is simple in design, yet provides an improved biasing seal to prevent leakage.

The present invention also provides an improved method for making a valve. The inventive method automatically moves a valve component from its naturally-molded shape to an inverted shape desired for valve operation, increasing production efficiency. The method additionally reduces inadvertent damage to the membrane.

Other features and advantages of the present invention are described in, and will be apparent from, the disclosure herein.

BRIEF DESCRIPTION OF THE DRAWINGS

FIGS. 3–6 are sectional side views of a mold assembly for unitarily molding the valve of FIGS. 1 and 2, according to an embodiment of the invention, wherein FIGS. 3–6 illustrate various stages of the molding process:

FIG. 3 illustrates the mold assembly forming a cavity in the desired valve shape;

FIG. 4 illustrates the mold assembly as a mold member is axially withdrawn, temporarily gripping the membrane, resulting in an automatic inversion;

FIG. 5 illustrates further withdrawal of the mold members, exposing the molded valve; and FIG. 6 illustrates ejection of the molded valve from remaining mold members.

FIGS. 7 and 8 are sectional side views of a mold assembly for integrally molding the valve according to another embodiment of the invention, wherein:

FIG. 7 illustrates the die assembly in a first molding stage of integrally molding the cylindrical spout wall, deck and post, without the membrane and stem; and FIG. 8 illustrates a second molding stage of molding the stem and membrane onto the post structure molded in FIG. 7.

FIGS. 9A and 9B are sectional side views of a valve according to another embodiment of the invention with a naturally-conical membrane shown in natural and "inverted" states, respectively.

FIGS. 14A and 14B are sectional side views of a valve according to another alternative embodiment of the invention in natural and "inverted" states, respectively.

FIG. 17 is a sectional side view of a container cap assembly according to another embodiment of the invention.

FIG. 18A is a plan view of a snap-closable container base including a valve of the present invention.

FIG. 18B is a side view of the container base of FIG. 18A.

FIG. 18C is an end view of the container base of FIG. 18A.

While the invention will be described in connection with certain preferred embodiments, there is no intent to limit it to those embodiments. To the contrary, various alternatives, equivalents, changes and modifications to the described embodiments will be apparent to those skilled in the art, and such changes and modifications may be made without departing from the spirit and scope of the invention. Therefore, the appended claims are intended to cover all such alternatives, equivalents, changes and modifications.

DETAILED DESCRIPTION OF THE PREFERRED EMBODIMENTS

Figure 2:
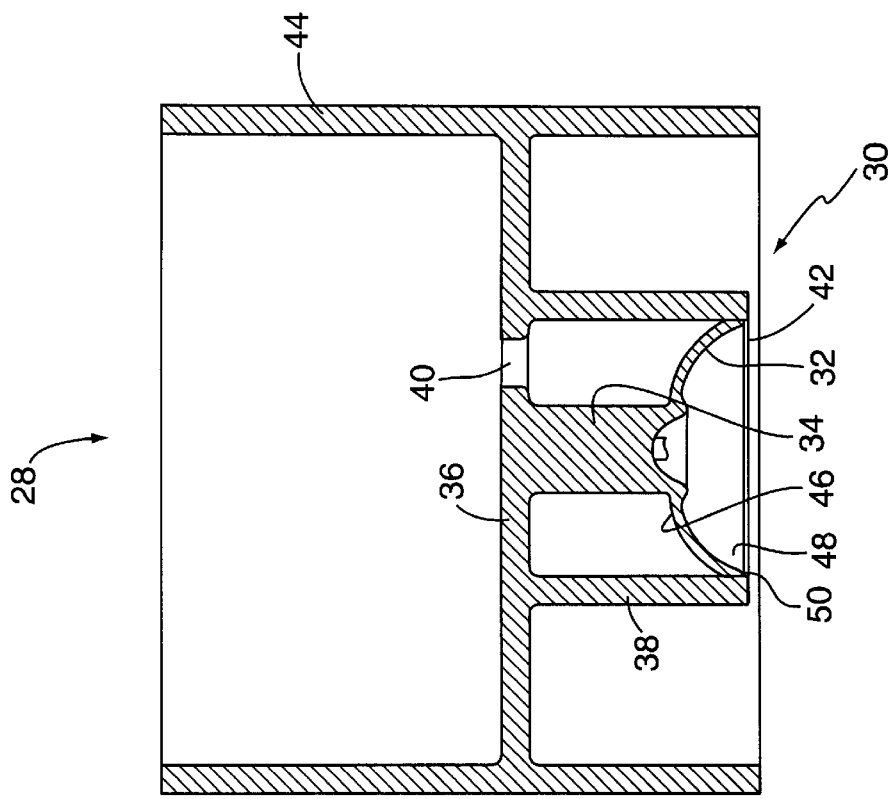
FIGS. 1 and 2 are sectional side views of a valve constructed in accordance with teachings of the invention, FIG. 1 illustrating the valve membrane in a natural or as-cured state, prior to inversion of the membrane, and FIG. 2 illustrating the valve when the membrane is "inverted".
Figure 1:
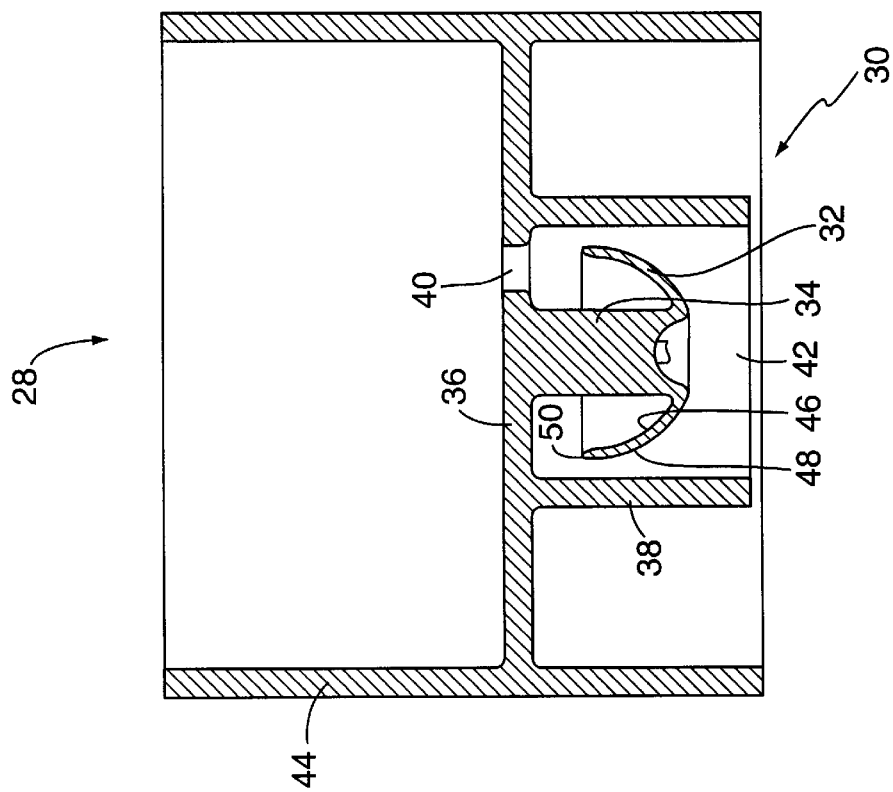

Now referring to the Figures, wherein like numerals designate like parts, there is shown in FIGS. 1 and 2 a cap 28 for attachment to the bottom of a squeeze container (not shown). The cap 28 includes a mounting wall 44 for attachment to the complimentary shaped bottom of the squeeze container by any appropriate means, and a deck 36 for generally closing the internal cavity of the bottle.

In accordance with the invention, a valve 30 is provided to dispense fluid from the container through the deck 36. Various additional valve embodiments according to the invention are illustrated in FIGS. 8 through 18. A common feature of these valves is that each has a membrane molded in a particular shape which is subsequently deformed elastically so that a peripheral edge of the membrane is biased in an advantageous sealing contact against a spout wall. More particularly, FIGS. 1 and 2 illustrate a valve 30 according to a preferred embodiment of the invention. FIG. 1 shows the valve 30 in an "as molded" state, whereas FIG. 2 illustrates the valve 30 in an elastically deformed shape as the valve 30 would be used in practice.

As illustrated in FIGS. 1 and 2, the valve 30 includes a membrane 32 integrally mounted on a stem 34 extending generally perpendicularly from a deck wall 36. Also extending from the deck wall 36 is a cylindrical spout 38 which concentrically surrounds the membrane 32 and stem 34, the spout 38 terminating at an exit opening 42. The membrane 32 has an inner face 46 generally facing the deck wall 36 and an opposite outer face 48 generally facing the exit opening 42. In the illustrated embodiment, the membrane 32, stem 34, deck wall 36 and spout 38 are integrally formed, however, other embodiments are possible wherein the valve is assembled from separate connected components.

For permitting fluid communication from the interior of the spout 38, the deck wall 36 has at least one orifice 40 disposed therein. Preferably, the deck wall 36 has three orifices 40, although only one is visible in FIG. 1.

The mounting wall 44 is generally cylindrical and concentrically surrounds the spout 38. As may be seen in FIGS. 1 and 2, the mounting wall 44 is connected radially outwardly to the deck wall 36 and preferably extends axially in both directions from the deck wall 36. In this way, the axially extending wall 44 which extends outward from the bottle provides additional protection to the valve 30 while presenting a pleasingly smooth appearance to the outside surface of the cap 28. It will further be appreciated that the extended wall 44 may be used at its lower edge to support the inverted container on a surface.

According to the invention, in the natural or "as molded" state of the membrane 32, the inner face 46 of the membrane 32 curves toward the deck wall 36 in a concave manner. In this state, the membrane 32 does not directly contact the spout 38. The valve 30 as shown in FIG. 1 is a relaxed state as the material of which it is formed was cured in a mold. The invention provides that the membrane 32 is elastically deformed to a shape opposite to that of its relaxed state.

According to an important feature of the invention, to operably position the valve according to the invention, the membrane 32 is "inverted" from its natural shape, as illustrated in FIG. 2, so that the inner face 46 of the membrane is no longer concave, but rather, so that the outer face 48 of the membrane 32 is concave. It will thus be appreciated that because the membrane 32 is made of a elastomeric material, it is resiliently urged toward the natural position of FIG. 1. In this way, a peripheral edge 50 of the membrane 32 is biased in a radially outward sealing contact against the spout 38. The diameters of the membrane 32 and spout 38 are selected with relative dimensions to optimize this sealing contact.

According to the invention, at least the membrane is made of a moldable elastomeric material, including any appropriate macromolecular material that returns rapidly to approximately its initial shape after deformation and release. This includes moldable thermoplastics, and a preferred material is polypropylene in a form known to those skilled in the art as a standard closure grade polypropylene. However, other elastomeric thermoplastic or rubber materials may also be suitable, such as silicon rubber, styrene butadiene rubber, ethylene propylene rubber, EPDM rubber, polybutadiene rubber, polyisoprene rubber, and other synthetic or naturally occurring rubber materials. While at least the membrane is formed of such an elastomeric material, it is also possible to form an entire valve, cap or closure from such a material.

In use, the valve 30 may be mounted to a bottom of a squeeze-type container (not shown) for dispensing a fluid product, such as shampoo, soap, etc. Normally, the fluid passes from the container through the orifices 40 under the force of gravity, but the membrane 32 prevents the fluid from exiting the spout 38 because of the resilient sealing contact. The valve 30 thereby facilitates drip-free fluid storage within the container. However, when the container is squeezed, the fluid is pressurized, forcing a dispensing flow of the fluid around the resilient membrane 32. More specifically, increased pressure by the fluid against inner face 46 of the membrane 32 causes the membrane 32 to resiliently deflect toward the exit opening 42 of the spout 38. This deflection causes a separation of the peripheral edge 50 from the spout 38, permitting the fluid to flow through the exit opening 42 of the spout 38.

Desirably, the valve 30 is designed to permit a "suckback" or breathing of air into the container after dispensing so that the container can return to its original volume. By selecting appropriate dimensions for the membrane and spout, this suckback can occur without flipping the membrane from its inverted shape.

Figure 3:
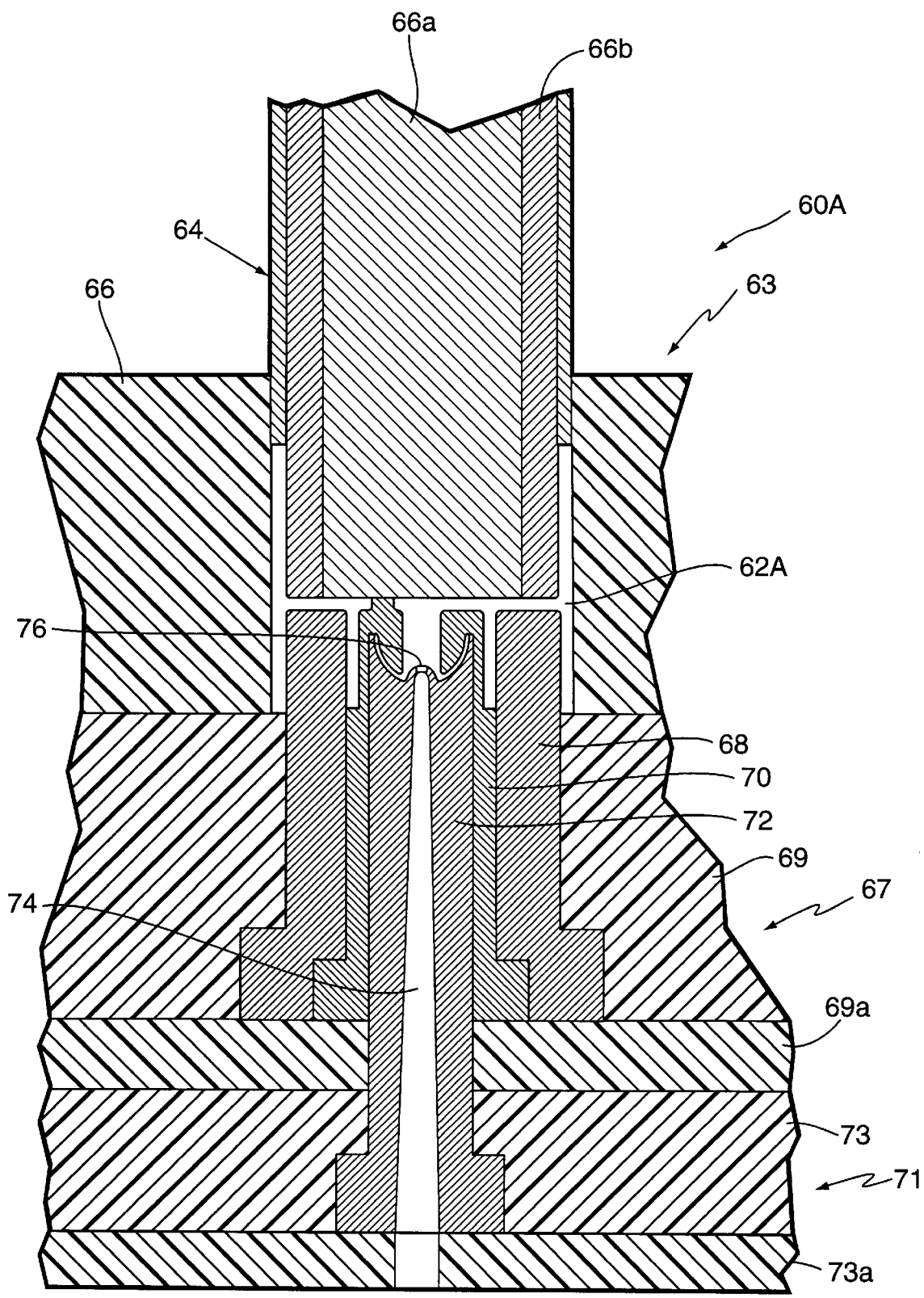

In accordance with another aspect of the invention, a method of making the valve 30 is provided. In particular, FIGS. 3–6 illustrate a mold assembly 60A which can be used to make the valve 30 of FIGS. 1 and 2. As shown in FIG. 3, the mold assembly 60A forms a cavity 62A in the desired shape of the valve 30 (FIGS. 1 and 2).

A valve mold assembly constructed in accordance with teachings of the invention generally includes at least three portions, an upper cap mold member forming the generally upper surfaces of the cap 28, a lower cap mold member forming the generally lower surfaces of the cap 28, and a valve inversion mold member. It will be appreciated, however, that the mold may be formed of only two parts, so long as the valve membrane is appropriately inverted during the molding process. According to an important feature of the invention, the lower cap mold member and the valve inversion mold member of the mold move relative to one another to cause the membrane 32 to invert during the demolding operation to the position shown, for example, in FIG. 2. It will be appreciated, however, that the three mold portions may each comprise one or more components.

In a valve mold assembly constructed according to the preferred embodiment of the invention, the mold portions include multiple interfitting components, as shown in FIG. 3. The upper cap mold member 63 includes components 66, 66a and 66b, which are held together to prevent relative movement. Note, however, that component 66b is rotatably disposed relative to component 60 in an embodiment wherein component 66b is shaped to form threads in the cap being molded. The inner components 66a and 66b together form the shape of a back face of the deck wall 36 (FIGS. 1 and 2) opposite the stem, as well as the portion of an inner surface of the mounting wall 44 (FIGS. 1 and 2). The components 66a, 66b are received within and secured to the outer component 66, which is shaped to form the outer surface of the sectional wall 44 (FIGS. 1 and 2).

Figure 4:
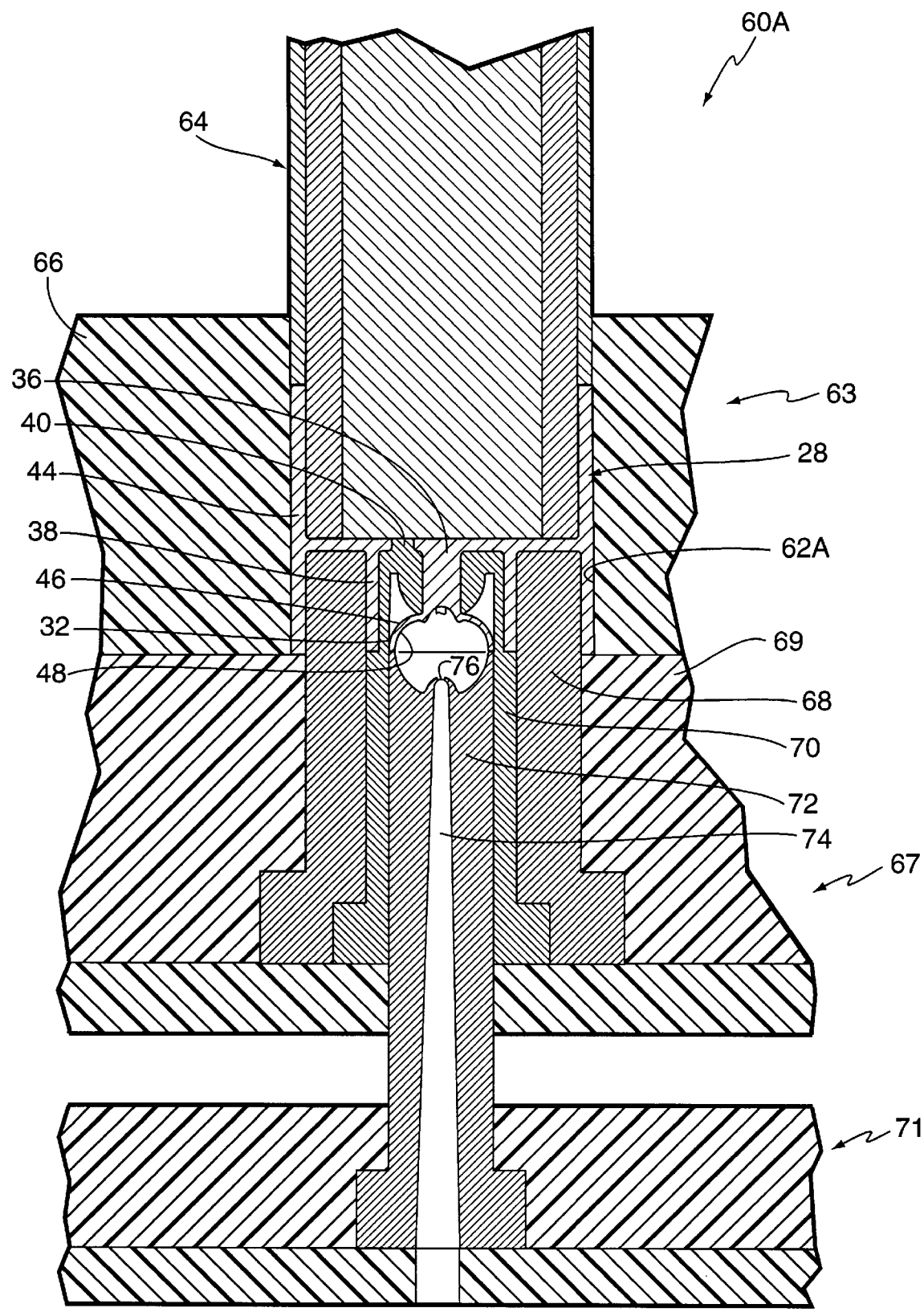
Figure 5:
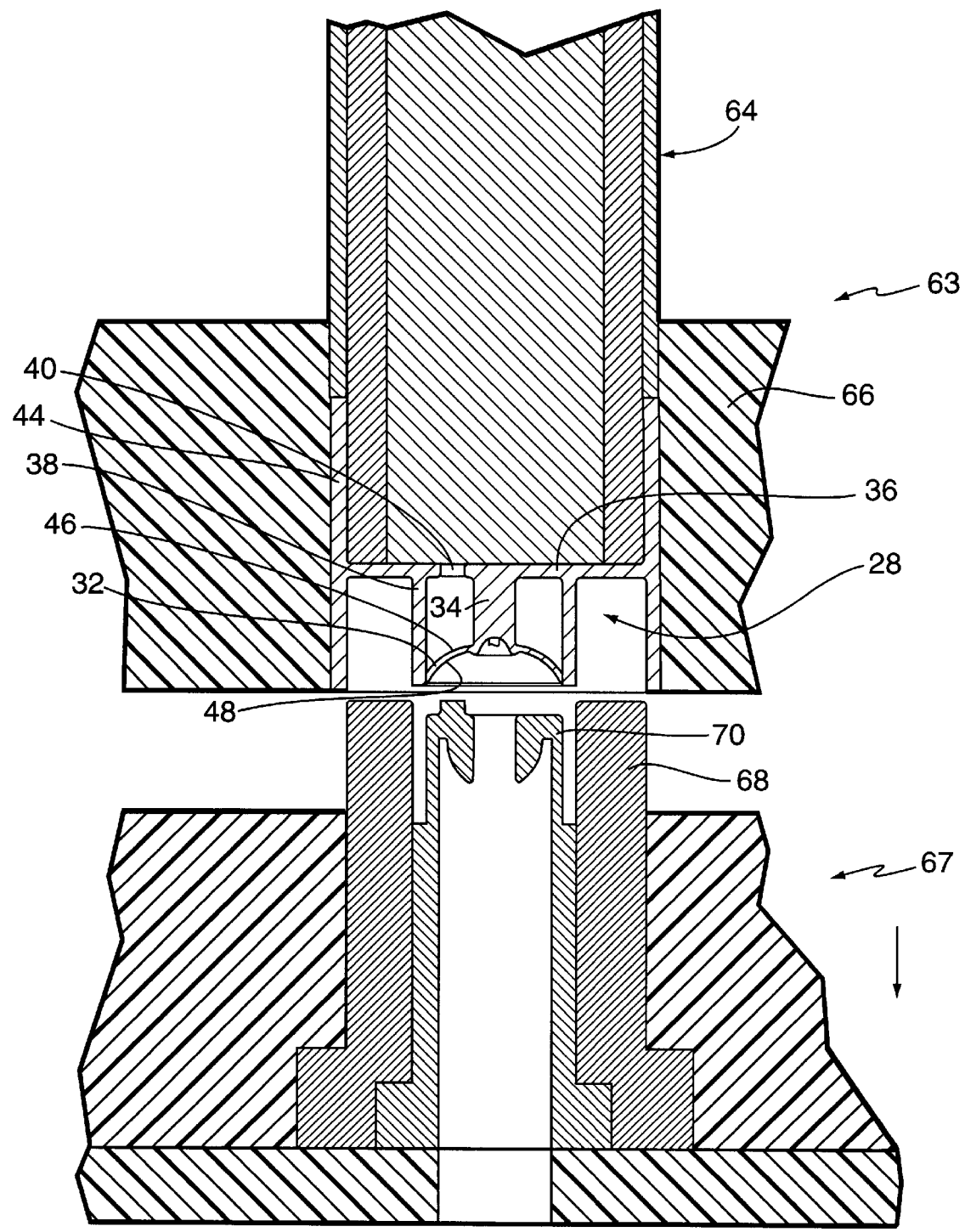

In order to assist in ejecting a molded cap 28 from the mold assembly 60A, the upper cap mold member 63 also includes an ejector sleeve 64, which is slidably received between components 66 and 66b. As shown in FIGS. 3–5, the ejector sleeve 64 is shaped to form an edge of the cap wall 44. As will be explained with regard to FIG. 6, once the cap 28 is molded and the lower cap mold member and valve inversion mold member disengaged from the molded cap 28, the ejector sleeve 64 moves relative to components 66, 66a, 66b to slide or eject the cap 28 from the upper cap member 63. It will be appreciated, however, that alternate structure, such as ejector pins, may be provided to eject the molded part.

Returning now to FIG. 3, the generally lower surfaces of the cap 28 opposite the upper mold member 63 are formed by the lower cap mold member 67 and the valve inversion mold member 71. The lower cap mold member 67 comprises components 68, 69, 69a, and 70, while the valve inversion member 71 comprises components 72, 73, 73a. The components 68, 70 of the lower cap mold member 67 are supported by components 69 and 69a such that they move in an axial direction as a single unit. Similarly, components 73, 73a of the valve inversion mold member 71 support component 72 such that they mover in an axial direction as a single unit. The components 68, 69, 70 and 72 fit together concentrically.

As shown in FIG. 4, support component 69 forms the lower edge of the cap wall 44, while the mold component 68 is shaped to form an outer surface of the spout 38, a portion of an interior of the mounting wall 44 and a portion of the lower surface of the deck wall 36. The mold component 70 is shaped to form the stem 34, the inner face 46 of the membrane 32, a valve-facing side of the deck wall 36, the orifices 40 and the interior and end of the spout 38 (FIG. 4). The mold component 72 is shaped to form the outer face 48 of the membrane 32 (FIG. 4).

In order to facilitate the injection of molten elastomeric material into the cavity 62A, the mold component 72 preferably includes an injection channel (shown schematically in FIGS. 3 and 4 as 74) which opens to the cavity at a gate 76, as shown in FIG. 3. It will be appreciated that an alternate gating system, for example, through one of the other mold components could be provided. After the material has been injected into the cavity, the mold members 63, 67, 71 are maintained in their relative positions shown in FIG. 3 for a sufficient period to permit at least partial curing of the elastomeric material.

Turning to FIG. 4, during the molding process the cavity 62A is filled with the elastomeric material and then cured into the cap 28 with the valve 30 in its natural or as-molded shape. In accordance with an important aspect of the invention, the mold members are disassembled in a manner which automatically inverts the membrane 32 while maintaining the integrity of the valve 30, without damaging the membrane 32. Specifically, as shown in FIG. 4, valve inversion mold member 71, and, accordingly, the mold component 72 is axially withdrawn from the lower cap mold member 67. The peripheral edge 50 of the membrane 32 may temporarily grip a corresponding tip of the mold component 72, thereby automatically pulling the membrane to the inverted state as shown in FIG. 4. This gripping can occur by a temporary "sticking together" adhesion between surfaces or by a mechanical engagement between mated undercut surface contours as in embodiments described below in connection with FIGS. 10A, 10B, 11A and 11B.

Turning to FIG. 5, the lower cap mold member 67 is then withdrawn. It will be appreciated from the drawings that the membrane 32 must be collapsibly pulled through a stem-forming portion of the cavity defined by the mold component 70. In this way, the membrane 32 would be automatically inverted as a result of being pulled through this opening, even if the temporary gripping described above with regard to FIG. 4 did not occur. However, when the inversion is performed prior to the withdrawal of the fourth mold member 70 (e.g., by temporary gripping), damage to the membrane 32 is less likely to occur. In the mold design illustrated, if the second mold member were withdrawn while the membrane was in its "as molded" shape, undesired tearing of the membrane may be possible.

Figure 6:
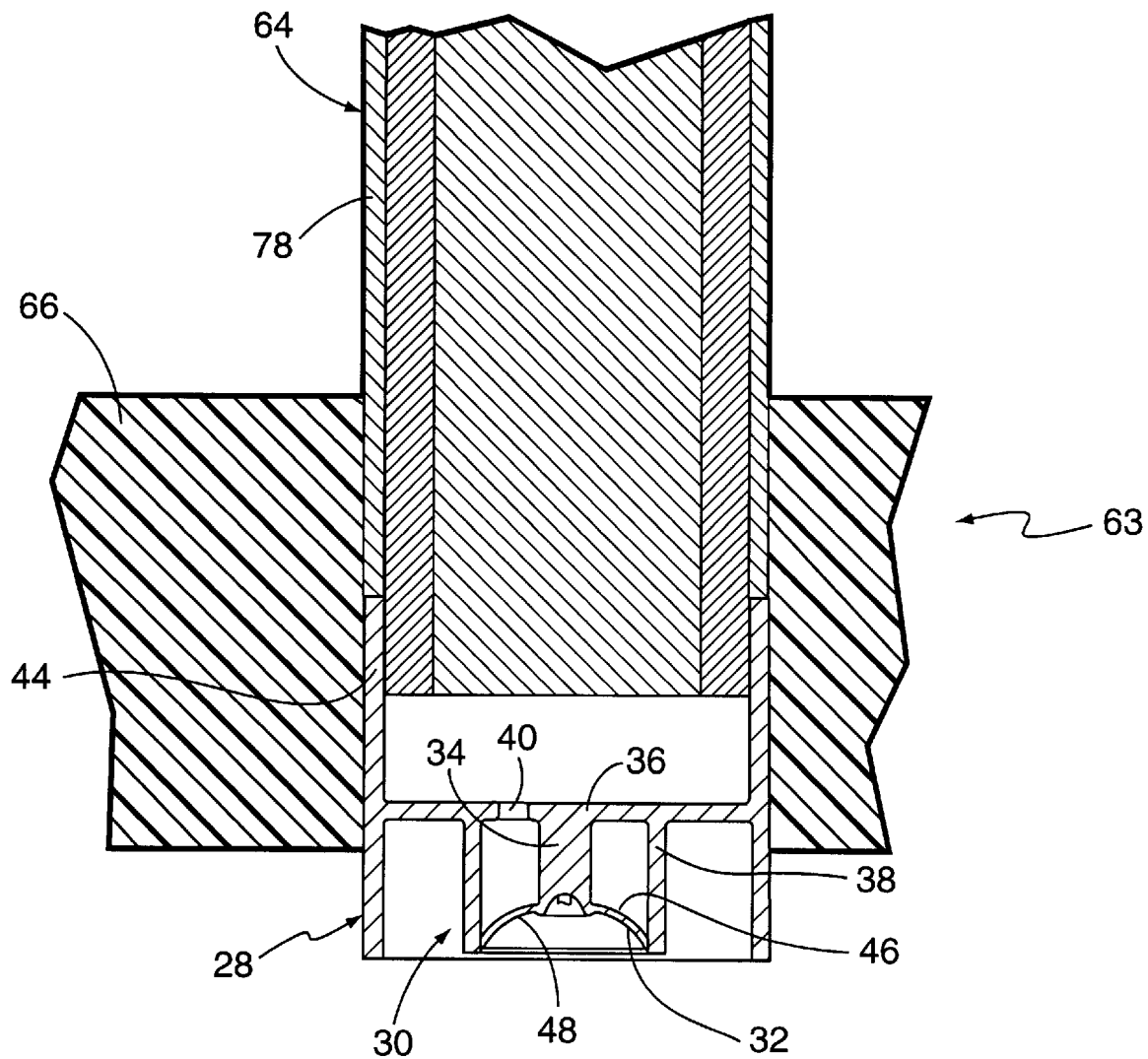

The valve 30 may then be withdrawn or ejected from the upper cap mold member 63. As illustrated in FIG. 6, the ejector sleeve 64 of the upper cap mold member 63 advances in an axially downward direction to eject the cap 28 from the mold 60A.

Figure 7:
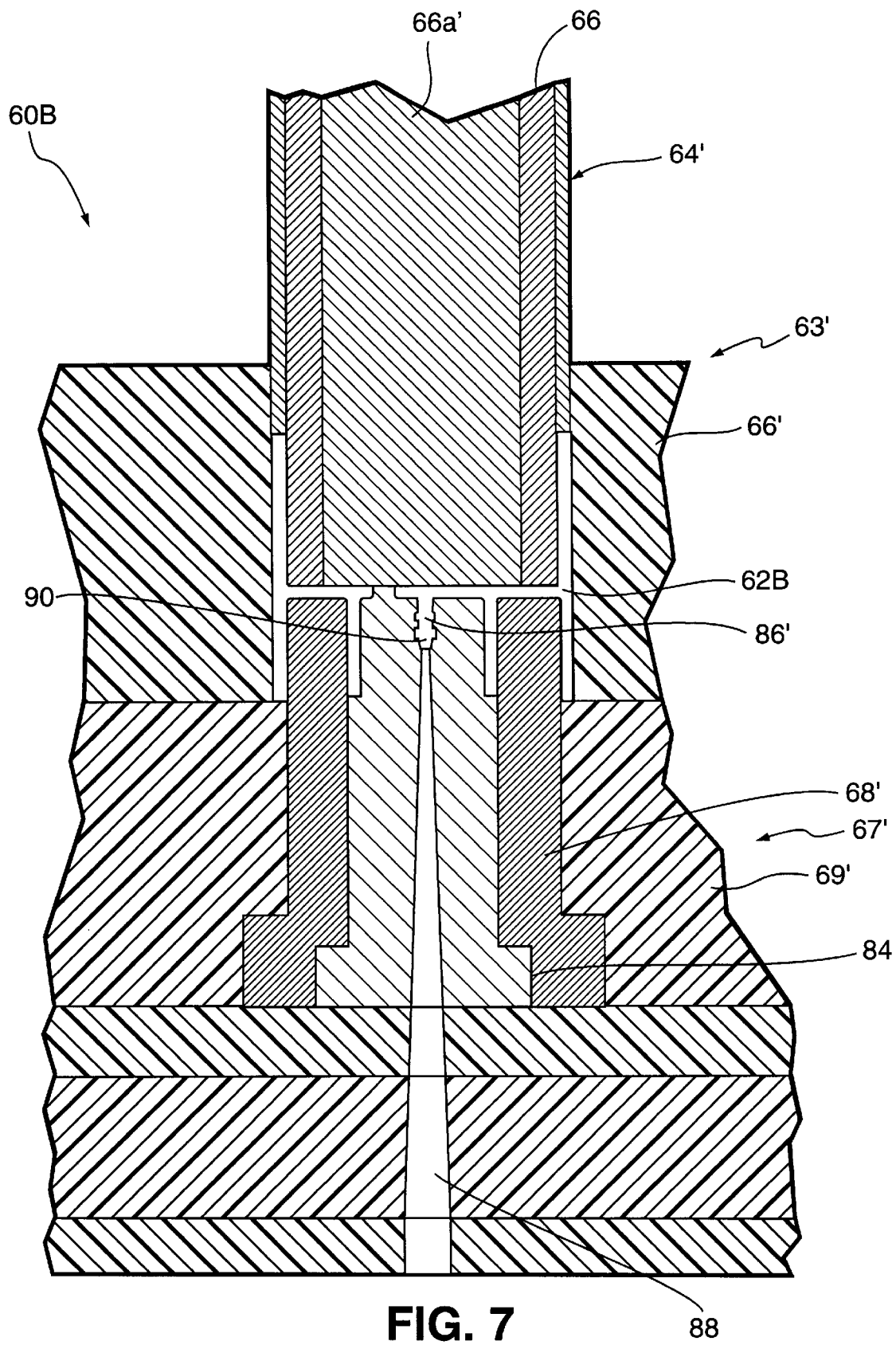
Figure 8:
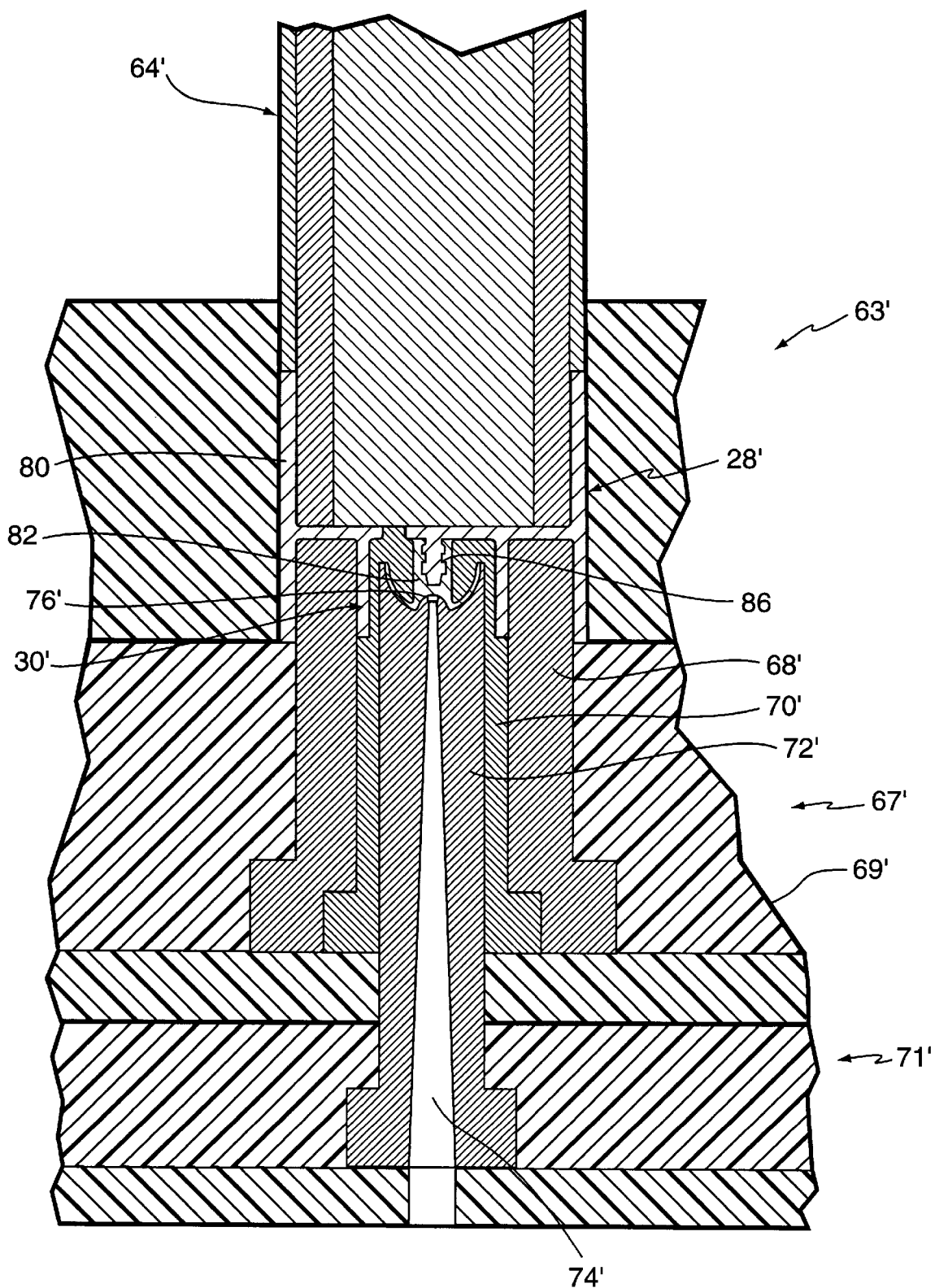

The valve made by the mold assembly according the FIGS. 3–6 is unitary, being uniformly made of a single material molded into a single piece. However, the invention is not necessarily limited to a valve having a unitary structure. Valve embodiments according to the invention may be formed of separate components integrally molded together or otherwise secured together. For example, FIGS. 7 and 8 illustrate a process of making and integrally-molded valve formed in two stages. As shown by FIG. 8, the resulting cap 28' has a valve 30' which includes a first valve component 80 and a molded-on second valve component 82. According to this method, the cap 28' is formed in a mold assembly 60B which comprises an upper cap mold member 63', a lower cap mold member 67' having a first removable core 84 for molding the first valve component 80 (see FIG. 7), and a second removable core 70' and valve inversion mold member 71' for molding the second valve component 82 and inverting the membrane 32' during demolding (see FIG. 8). The upper cap mold member 63', the lower cap mold member 67' with the second removable core 84, and the valve inversion mold member 71' may be of substantially the same design as shown in FIGS. 3–6.

More particularly, as shown in FIG. 7, a mold assembly 60B is provided in a configuration in which the upper cap mold member 63', the lower cap mold member 67' and the first removable core 84 form a cavity 62B for forming the first valve component 80. This cavity 622 defines a structure similar to the cap 28 and valve 30 of FIGS. 1 and 2, as the cavity 62B is shaped to define the deck wall, spout and mounting wall similar to the previously-described cap 28. However, the cavity 62B does not define the membrane or the complete stem and instead defines a cavity 86' for forming a narrow post 86 which extends axially from the deck wall where the stem is to be molded. The post 86 facilitates the secure attachment of a subsequently molded-on second component comprising the stem and membrane, as described below.

As indicated above, the mold assembly 60B may initially include the upper cap mold member 63' and the components 68' and 69' of the lower cap mold member 67' previously described in connection with the mold assembly 60A of FIG. 3. In addition, however, the mold assembly 60B includes a first removable core 84, or a post-forming mold member 84 which defines the cavity 86'. This post-forming mold member 84 forms an interior of the spout, the deck wall, the orifice and the narrow post 86 extending centrally from the deck wall. As with the lower cap mold member 67 of the first molding embodiment shown in FIGS. 3–6, the post-forming mold member 84 includes an injection channel 88 and a gate 90 opening into the cavity 62B for the molding of the first valve component 80.

Referring now to FIG. 8, when the first component 80 has been molded and cured, the post-forming mold member 84 is withdrawn and replaced by the lower cap mold members 70', 72' previously described in connection with FIG. 3. At this point, the same mold assembly 60B is assembled in FIG. 8 as previously described, except that the cavity contains the molded valve component 80 and remains void only in the membrane and stem volumes as defined by the mold components 70', 72' (except for the narrow post). Material is injected through the injection channel 74' and gate 76' in the mold component 72' to form the second valve component 82, molding-on the stem around the post 86 and the membrane. The post 86 is preferably formed with an irregular surface, radial extensions, or annular grooves to provide axial gripping against the molded-on stem.

This process, explained with regard to FIGS. 7 and 8, may be used to advantageously form a valve wherein the first valve component 80 (i.e., the deck wall, spout, mounting wall and post) is formed of a rigid or durable material, while the second valve component 82 (i.e., the stem and membrane) is formed of a more flexible and resilient material.

In keeping with the invention, valves according to the invention may be provided in various shapes. For example, a cap 128 having a valve 130 is illustrated in FIG. 9A including a stem 134, deck wall 136, spout 138 and orifices 140 similar to the embodiment of FIGS. 1 and 2, however, the valve 130 of FIG. 9A has a membrane 132 molded in a conical shape which cups toward the deck wall 136 as it is molded. The membrane 132 inversible, or deflected inside-out, as illustrated in FIG. 9B, so that the membrane 132 is held in an elastically-deformed shape which may be substantially flat, as shown, yet which maintains a radially-outward bias of a peripheral edge 150 of the membrane 132 against an interior surface of the spout 138. In illustrating this embodiment of the invention, as well as the embodiments that follow, the as-molded condition is generally illustrated as FIG. _"A", while the inverted position is shown as FIG. _"B".

As explained in connection with FIG. 4, it is desirable that the membrane is "inverted" upon withdrawal of a mold member (e.g., the mold component 72) which forms the outer face of the membrane and before the withdrawal of a mold member (e.g., the mold component 70) which forms the rear face. In order to ensure the occurrence of such an inversion or elastic deflection, various embodiments are provided which exhibit an enhanced temporary gripping effect between the outer wall of a membrane and the corresponding mold surface. Examples of such embodiments are shown in FIGS. 10A, 10B, and 11A and 11B.

Figure 10B:
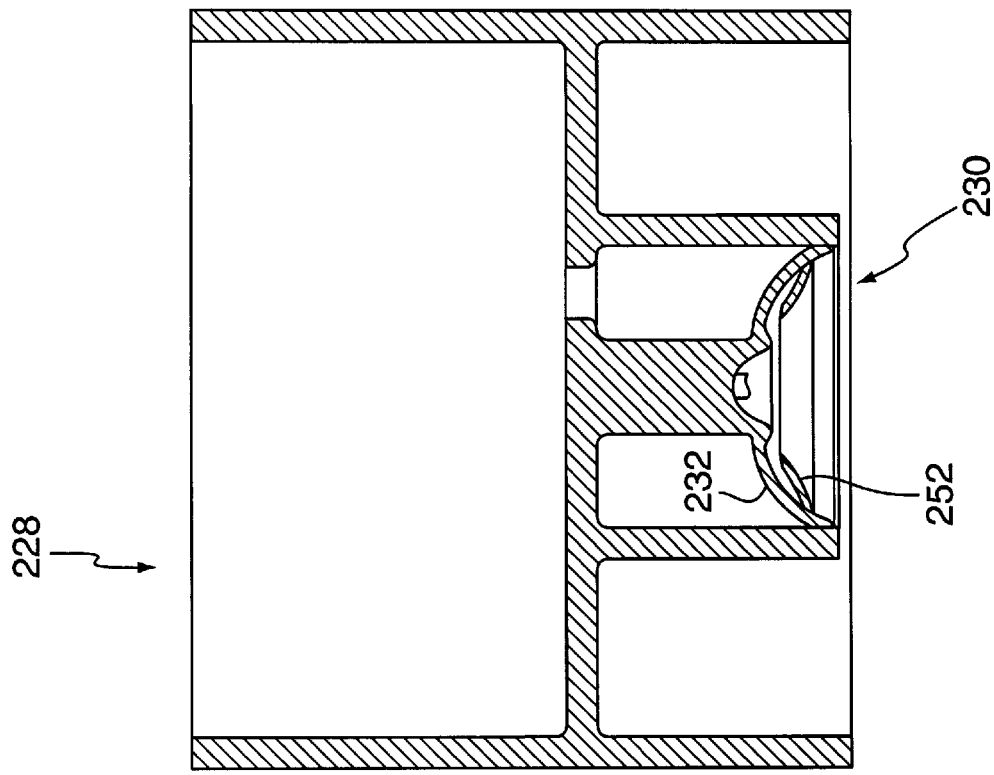
FIGS. 10A and 10B are sectional side views of a valve according to a further embodiment of the invention with a cupped membrane in natural and "inverted" states, respectively, wherein the membrane includes an annular, intermediately-positioned, inwardly-directed lip.
Figure 10A:
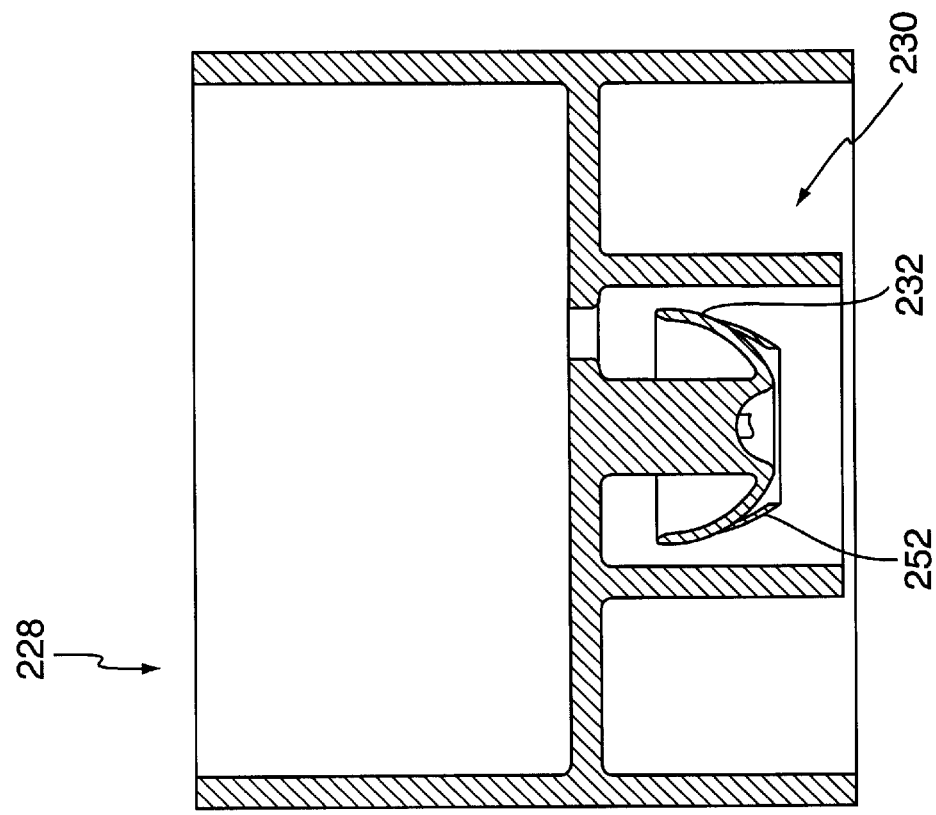
Figure 11B:
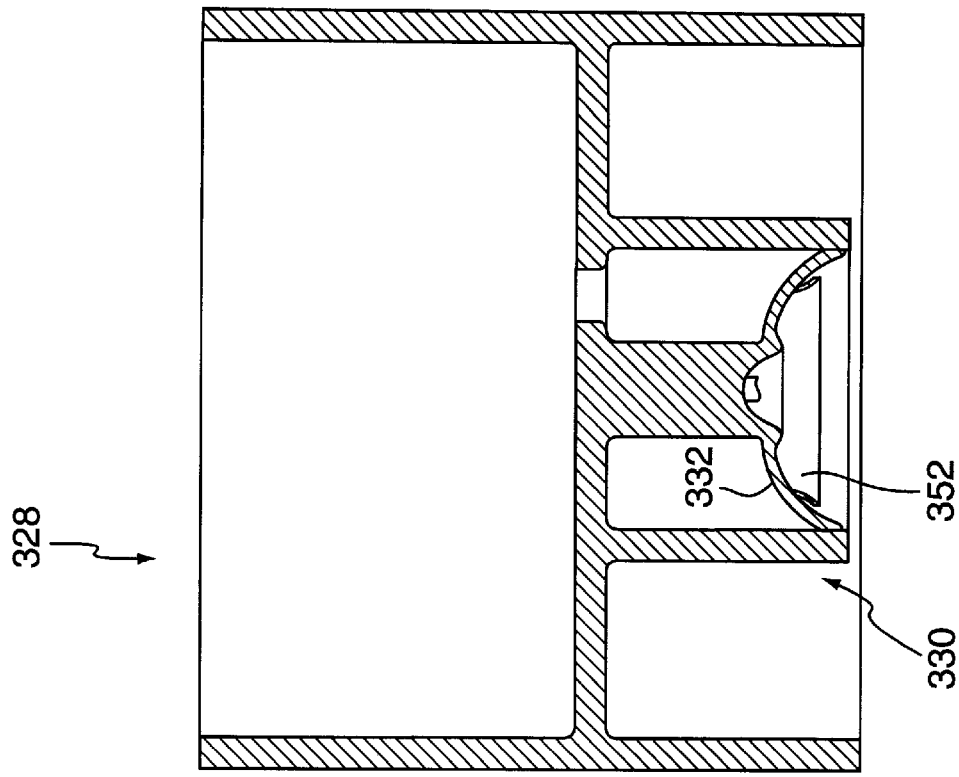
FIGS. 11A and 11B are sectional side views of a valve according to yet another embodiment of the invention with a cupped membrane in natural and "inverted" states, respectively, wherein the membrane includes an annular, intermediately-positioned outwardly-directed lip.
Figure 11A:
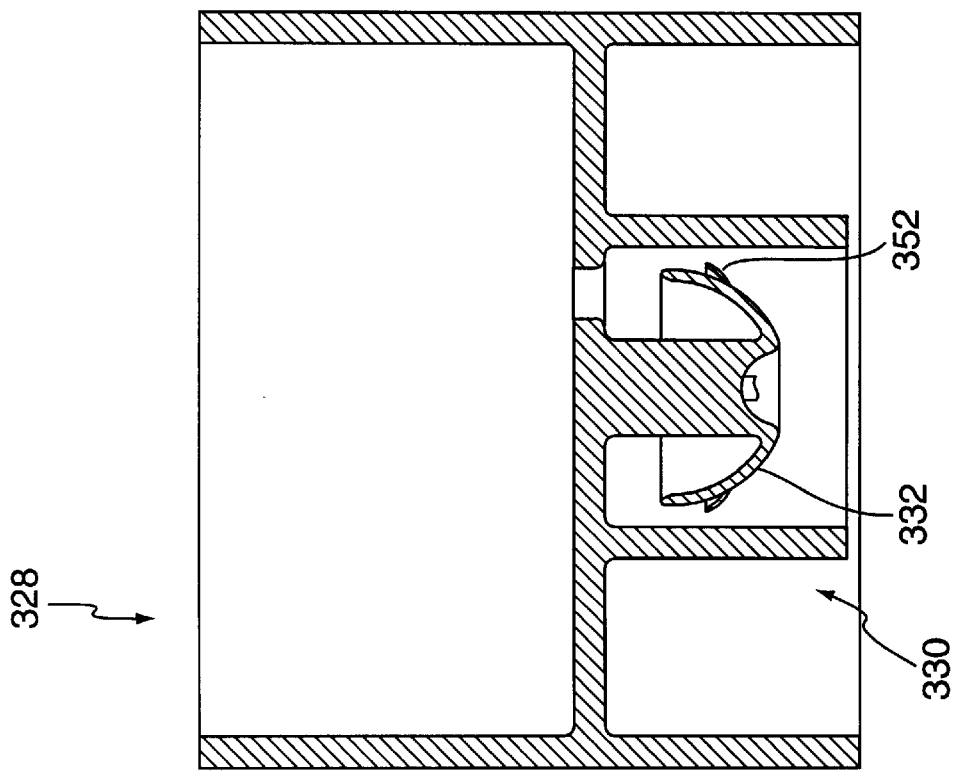

Specifically, the embodiment of FIGS. 10A and 10B provides cap 228 having a valve 230 similar to the valve 30 of FIGS. 1 and 2, except that the valve 230 also includes an annular, inwardly-directed lip 252 which protrudes from an outer face of the membrane 232. This thin lip 252 grips within a cavity of a corresponding mold (not shown) to provide an enhanced axial pulling force or temporary gripping between the membrane 232 and this mold member as the mold member is withdrawn. Similarly, the embodiment of FIGS. 11A and 11B provides a cap 328 having a valve 330 with an annular, outwardly-directed lip 352 that performs a similar function.

Figure 12C:
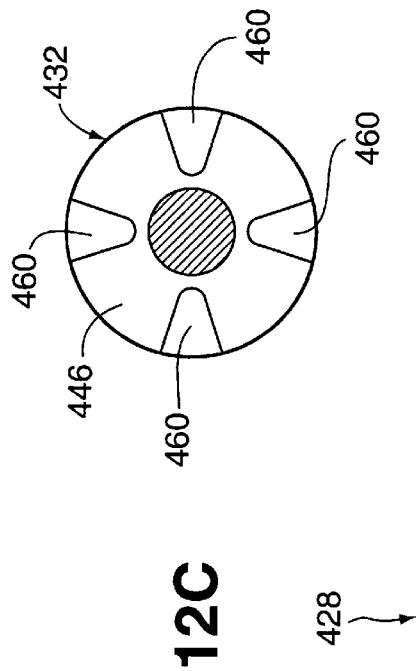
FIG. 12C is a sectional plan view taken generally along line 12C—12C of FIG. 12B.
Figure 12B:
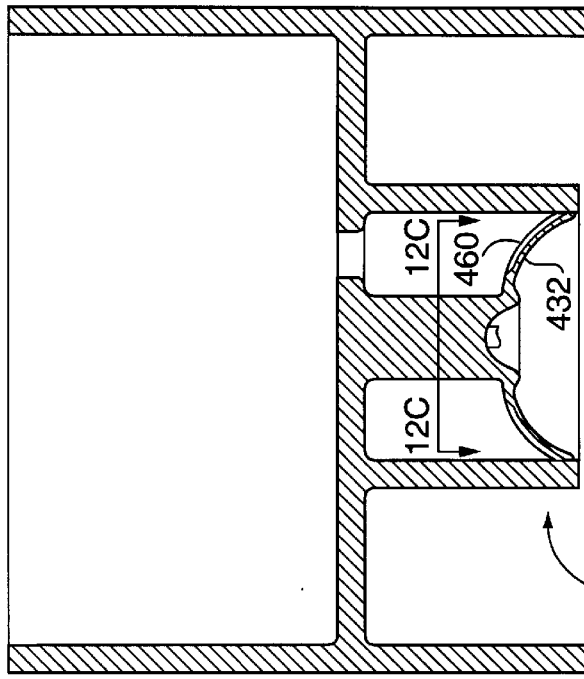
FIGS. 12A and 12B are sectional side views of a valve according to a still further embodiment of the invention in natural and "inverted" states, respectively, wherein a product side of the membrane includes a plurality of radial outwardly-extending recesses.
Figure 12A:
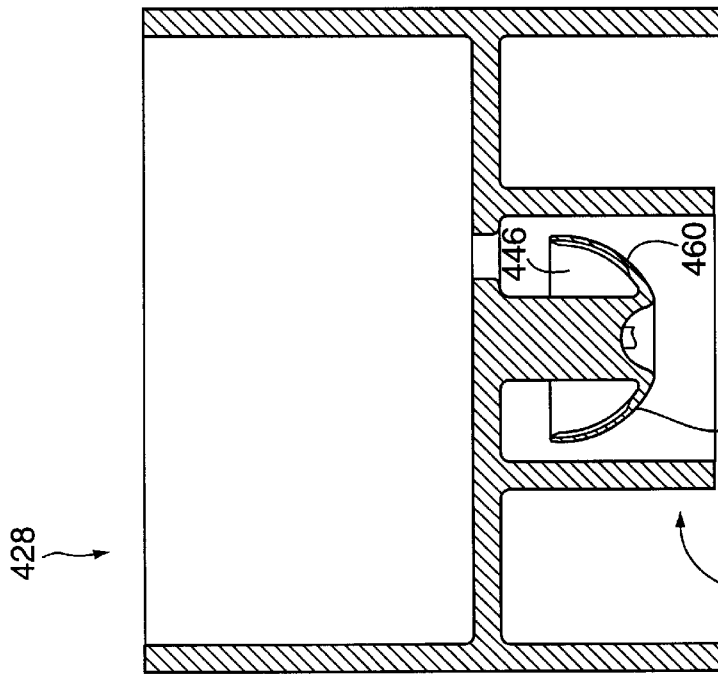

For also providing enhanced withdrawal characteristics, and additionally providing reliable breathing, a cap 428 having a valve 430 is provided as illustrated in FIGS. 12A–C. The valve 430 is similar to that described in connection with FIGS. 1 and 2, except that the valve 430 has a membrane 432 which includes a plurality of radially-extending recesses 460 or areas of reduced thickness in its inner face 446. It will be appreciated by those skilled in the art that these radially extending recesses may be positioned to promote a preferred fluid flow path or area for "suckback".

Figure 13:
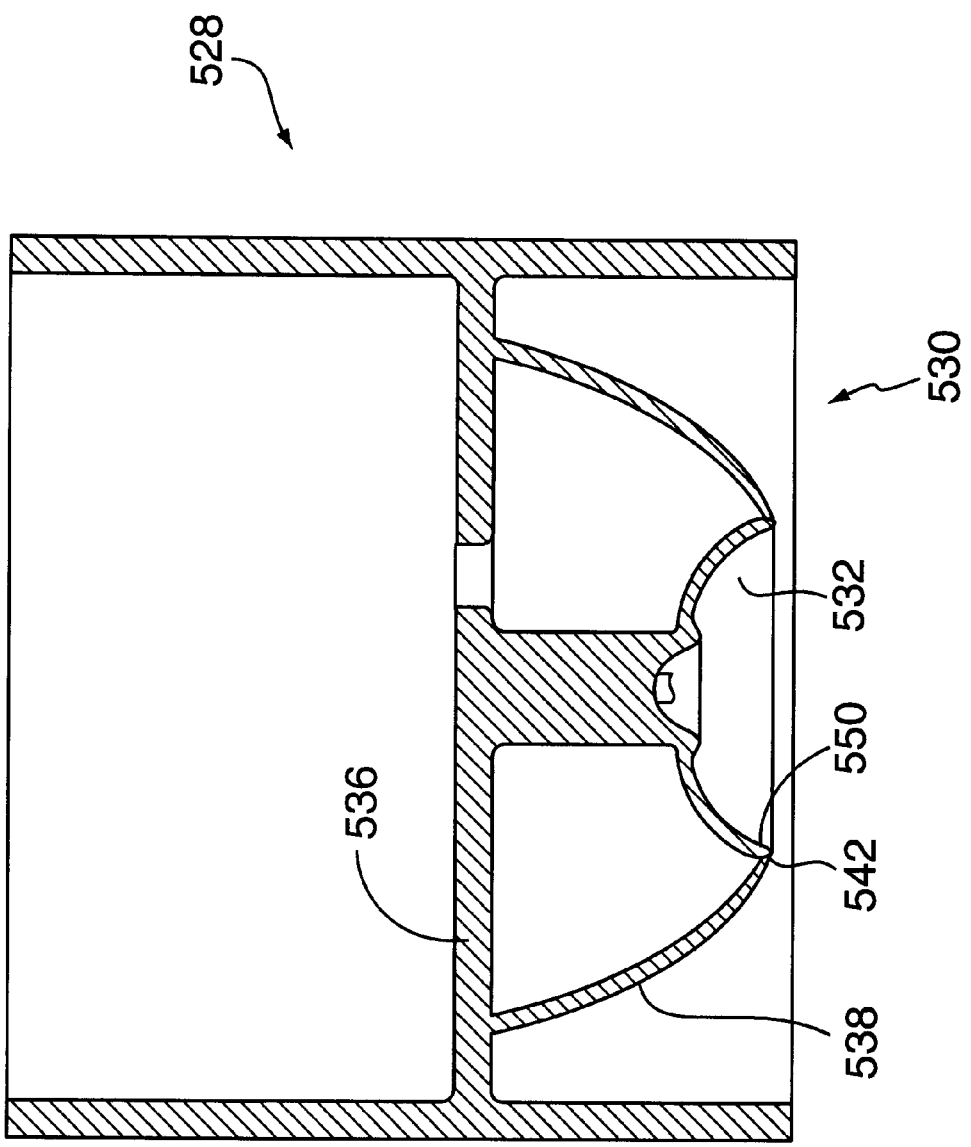
FIG. 13 is a sectional side view of a valve according to an alternative embodiment of the invention.

Yet another alternative embodiment is illustrated in FIG. 13. In this embodiment, a cap 528 having a valve 530 is provided which is similar to the valve described in connection with FIGS. 1 and 2, but includes a dome-shaped spout 538. The spout 538 curves inwardly as it extends away from a deck wall 536, the spout 538 terminating at an annular exit opening 542 which meets in sealing contact with a peripheral edge 550 of the membrane 532.

Figure 15B:
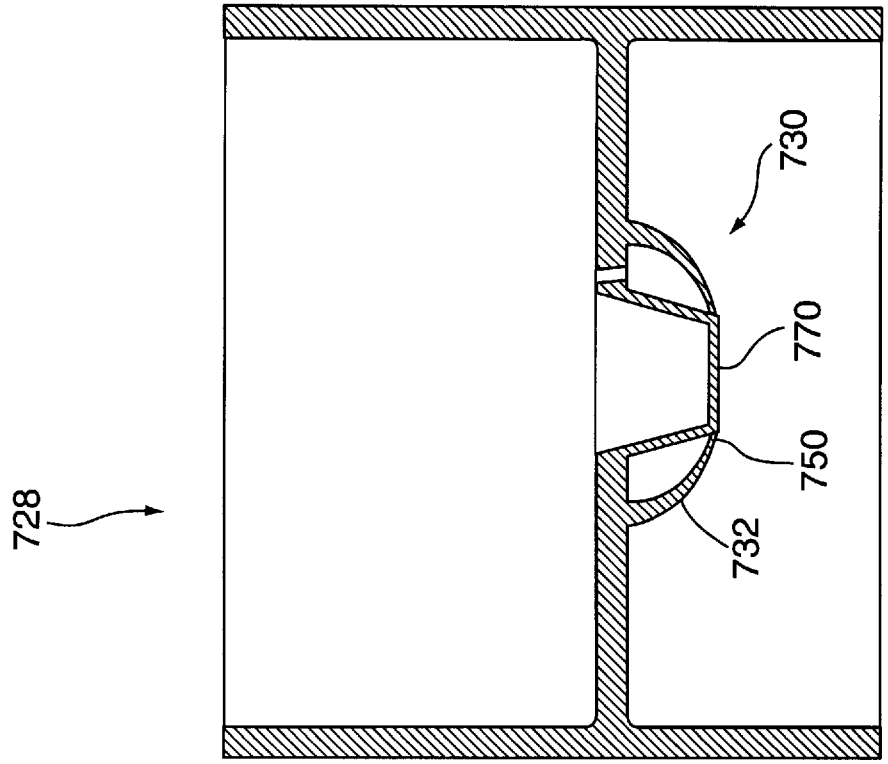
FIGS. 15A and 15B are sectional side views of a valve according to still another alternative embodiment of the invention in natural and "inverted" states, respectively.
Figure 15A:
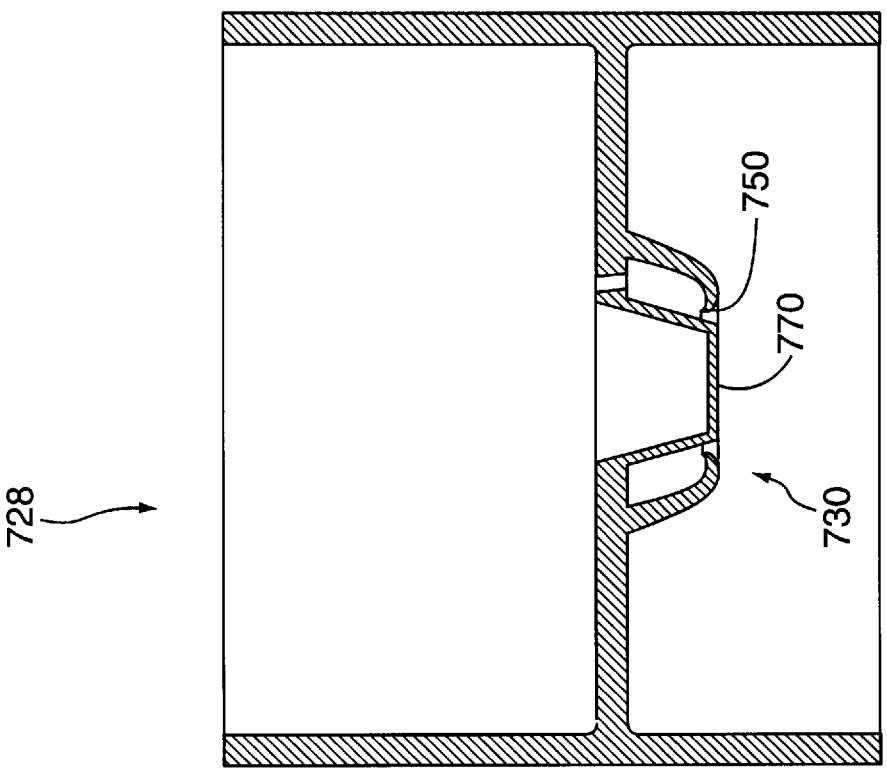

Although the embodiments illustrated in FIGS. 1–13 have membranes wherein a sealing contact is formed by an outer peripheral edge of the membrane, the invention is not limited to such a configuration. For example, FIGS. 14A and 14B illustrate a cap 628 including a valve 630 which has a membrane 632 with a radially-inwardly projecting peripheral edge 650. In this embodiment, a spout is formed by the membrane itself as well as a central sealing nub 670 extending from the deck wall 636. Similarly, FIGS. 15A and 15B illustrate another cap 728 including a valve 730 which has a membrane 732 with an inwardly-directed sealing edge 750 that sealably resiles against a central pedestal 770.

Figure 16:
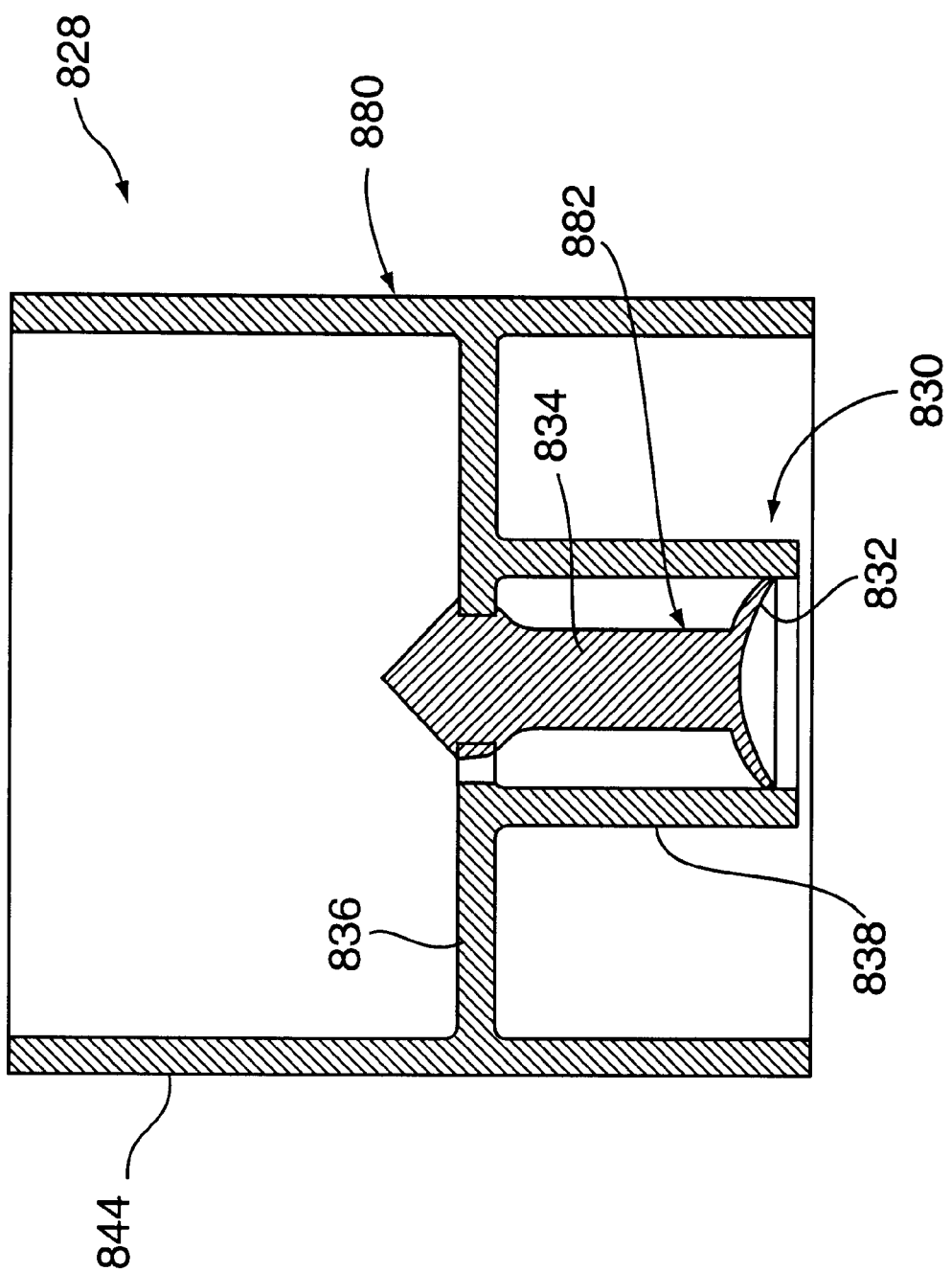
FIG. 16 is a sectional side view of a valve according to a two-piece embodiment of the invention wherein the membrane is in an inverted condition.

Valves according to the invention may also be provided having a multiple piece design, for example, as shown in FIG. 16. FIG. 16 illustrates a cap 828 having a valve 830 similar to the valve 30 of FIGS. 1 and 2, except the valve 830 includes first and second valve components 880 and 882, respectively, that secure together in a snap-fit manner described in a copending application Ser. No. 08/927,345 assigned to the same assignee of this application. In particular, the first valve component 880 includes a deck wall 836, spout 838 and mounting wall 844. The second valve component 882 includes a stem 834 and membrane 832 (shown in the operable inverted state). The stem 834 of the second valve component 882 is securably received in a cooperatively-shaped opening in the deck wall 836.

A further alternative embodiment is illustrated in FIG. 17 which provides a cap 1028 including a valve 1030 with a recessed deck wall 1036 which may include one or more orifices 1040 disposed laterally of the stem 1032. In this embodiment, the generally annular spout is defined substantially adjacent the exit opening 1042. It will be appreciated by those skilled in the art that the recessed deck wall 1036 of this design permits the placement of a removable sealing paper or label 1044 along the lower surface of the cap 1028 to hygienically seal the container (not shown) and to prevent inadvertent spillage during shipment.

Another design which prevents leakage during shipping, display and storage is shown in FIGS. 18A–18C. In this embodiment, the cap 928 is similarly provided with a recessed deck wall 936. In this embodiment, however, the cap 928 includes a flip-top closure 902 which is hingedly coupled to cover the valve 930 during shipment. As best seen in FIG. 18B, the flip-top secondary closure 902 (shown in an open position) hinges inward, and snap-fits over the exit opening 942 of the valve 930 to provide an effective seal. The secondary closure 902 may be integrally formed with the cap 928 and hingably secured thereto via a living hinge 904. Optionally, the secondary closure 902 may be held in an open position by a snap or interference fit within a complementarily-shaped recess formed in the cap 928.

Those skilled in the art will recognize that performance of the valve will be influenced by various factors such as viscosity of the fluid product being dispensed, container pressure, diameter of the dispensing channel, and flexibility of the elastomeric material, etc. Accordingly, the specific valve design may vary as needed from application to application, and the various valve dimensions and materials may be appropriately selected to suit a particular need. Moreover, while the valve has been described with regard to a generally circular shape, the valve may be of a different shape such as oval or generally rectangular or the like.

What is claimed is:

1. A method for making a valve, the valve having a membrane with oppositely-directed faces and a stem extending from a center of one of the faces, the method comprising the steps of:

integrally molding an elastomeric material to form the stem and membrane in a shape such that the face of the membrane opposite the stem has a convex shape;

curing the elastomeric material while the membrane is in the convex shape; and elastically inverting the cured membrane so that the face opposite the stem has a concave shape.

2. A method as defined in claim 1, wherein the step of elastically inverting the cured membrane includes the steps of withdrawing a first mold member in a direction axially parallel to and away from said stem, the peripheral edge of the membrane temporarily gripping a second mold member as the first mold member is withdrawn to invert said membrane.

3. A method as defined in claim 1, further comprising:

molding a deck wall and spout so that said spout concentrically surrounds said stem and membrane and so that said spout and stem extend from said deck wall, whereby after said membrane has been inverted, a peripheral edge of said membrane is in radially biased contact against an interior surface of the spout.

4. A method as defined in claim 3, further comprising the step of unitarily molding said stem, membrane, deck wall and spout.

5. A method as defined in claim 3, wherein the step of molding the deck wall and spout comprises the step of integrally molding said deck wall and spout as a component which includes a narrow post extending from said deck wall concentrically within said spout.

6. A method as defined in claim 5, wherein the step of integrally molding an elastomeric material includes the step of molding said stem and membrane to the post as a second component so that said stem surrounds the post.

7. A method as defined in claim 6, wherein the step of molding the deck wall and spout includes the step of molding a rigid first component, and the step of integrally molding an elastomeric material includes the step of molding a more flexible and resilient second component.

8. A method for making a valve having a tubular spout with an exit opening and a membrane with oppositely-directed inner and outer faces, the method comprising the steps of:

molding the membrane from an elastomeric material so that the membrane has a natural shape which is cupped toward the inner face;

curing the cupped membrane mounting the membrane relative to the spout so that the outer face of the membrane is directed toward the exit opening; and deflecting the membrane inside-out so that the membrane cups away from the inner face toward the outer face and so that a peripheral edge of the membrane biases in a radial, annular contact against the spout when mounted.

9. A method as defined in claim 8, wherein the valve further includes a stem centrally extending from said inner face of said membrane, and wherein the valve includes a deck wall from which the stem and tubular spout concentrically extend, and wherein the molding and mounting steps include integrally molding the membrane, stem, deck wall and spout.

10. A method as defined in claim 9, wherein said molding step includes:

providing a first mold member forming a back face of said deck wall;

providing a second mold member forming said stem and said inner face of said membrane;

providing a third mold member forming said outer face of said membrane;

assembling the mold members to form a cavity in the shape of said valve.

11. A method as defined in claim 10, wherein said deflecting step includes:

temporarily gripping said peripheral edge of the molded membrane to said third mold member forming said outer face;

withdrawing said third mold member forming said outer face from said second mold member forming said inner face during the gripping step to pull said peripheral edge toward said exit opening.

12. A method as defined in claim 10, wherein said deflecting step includes:

withdrawing said second mold member forming said inner face and said stem so that said membrane is pulled through a stem-forming portion of the cavity which is smaller in crosswise dimension than said membrane.

13. A method as defined in claim 8, wherein the valve further includes a stem centrally extending from said inner face of said membrane and a deck wall having a central post, the molding step and mounting step include:

molding the spout, deck wall and central post as a first component; and integrally molding the membrane and stem as a second component so that the stem surrounds said post.

14. A method as defined in claim 13, wherein the molding steps include the steps of molding the first component and second component from materials having respectively different flexibilities.

* * * * *